United States Patent [19]

Irie et al.

[11] Patent Number: 6,101,434
[45] Date of Patent: Aug. 8, 2000

[54] BEHAVIOR CONTROL DEVICE OF VEHICLE BASED UPON DOUBLE CHECKING OF YAW RATE DEVIATION

[75] Inventors: Yoshiaki Irie, Numazu; Yoshiaki Matsuo, Tagata-gun, both of Japan

[73] Assignee: Toyota Jidosha Kabushiki Kaisha, Toyota, Japan

[21] Appl. No.: 09/098,418

[22] Filed: Jun. 16, 1998

[30] Foreign Application Priority Data

Jul. 23, 1997 [JP] Japan ................... 9-212648

[51] Int. Cl.$^7$ ................ G06F 7/00; G06G 7/76
[52] U.S. Cl. ................ 701/36; 701/38; 701/70; 701/72; 303/140; 303/146; 180/197
[58] Field of Search .................. 701/69, 70, 71, 701/73, 74, 75, 76, 79, 82, 83, 89, 90, 92, 38, 72, 37, 36, 41; 303/146, 147, 116.2, 122.08, 140, 139, 163; 280/5.504, 5.513, 5.512, 5.51; 180/410, 412, 422, 197, 415, 413

[56] References Cited

U.S. PATENT DOCUMENTS

| | | | |
|---|---|---|---|
| 4,761,022 | 8/1988 | Ohashi et al. | 280/5.504 |
| 5,228,757 | 7/1993 | Ito et al. | 303/146 |
| 5,627,756 | 5/1997 | Fukada et al. | 701/70 |
| 5,642,281 | 6/1997 | Ishida et al. | 701/41 |
| 5,822,709 | 10/1998 | Fujita | 701/70 |
| 5,893,896 | 4/1999 | Inamura et al. | 701/70 |
| 5,915,800 | 6/1999 | Hiwatashi et al. | 303/146 |
| 5,964,819 | 10/1999 | Naito | 701/72 |

FOREIGN PATENT DOCUMENTS

| | | |
|---|---|---|
| 4214642A1 | 4/1993 | Germany . |
| 4-133825 | 5/1992 | Japan . |
| 6-115418 | 4/1994 | Japan . |

*Primary Examiner*—Jacques H. Louis-Jacques
*Attorney, Agent, or Firm*—Oliff & Berridge, PLC

[57] ABSTRACT

A behavior control device of a vehicle adapted to detect a first yaw rate deviation of a yaw rate detected by a yaw rate sensor relative to a standard yaw rate estimated from a steering angle detected by a steering angle sensor and a vehicle speed detected by a vehicle speed sensor, and also detect at least one of a second yaw rate deviation of a yaw rate estimated from wheel rotation speed of a pair of left and right wheels from the standard yaw rate and a third yaw rate deviation of a yaw rate estimated from a lateral acceleration detected by a lateral acceleration sensor and a vehicle speed detected by a vehicle speed sensor from the standard yaw rate, and execute a yaw rate suppress control such as a spin or driftout suppress control, when the first yaw rate deviation exceeds a threshold value determined therefor and at least one of the second and third yaw rate deviations also exceeds a threshold value determined therefor.

5 Claims, 7 Drawing Sheets

BEHAVIOR CONTROL DEVICE OF VEHICLE BASED UPON DOUBLE CHECKING OF YAW RATE DEVIATION

BACKGROUND OF THE INVENTION

1. Field of the Invention

The present invention relates to a behavior control of vehicles against a spin and/or a driftout, and more particularly, to a behavior control device of a vehicle for controlling the brake system of the vehicle, so as to apply a controlled braking to a selected one or ones of the wheels, to act against an increase of a deviation of the actual yaw rate detected by a yaw rate sensor relative to a standard yaw rate estimated form the steering angle and the vehicle speed, when the deviation increases beyond a threshold value determined therefor.

2. Description of the Prior Art

It is already known to control the behavior of a vehicle against a spin and/or a driftout by applying a controlled braking to a selected one or ones of the wheels, by watching a deviation of the actual yaw rate detected by a yaw rate sensor relative to a standard yaw rate estimated from the steering angle and the vehicle speed, so as to execute such a behavior control when the deviation increases beyond a threshold value determined therefor, as described in, for example, Japanese Patent Laid-open Publication 6-115418. Such a behavior control is substantially effective in suppressing a spin and/or a driftout of a vehicle, since the deviation of the actual yaw rate detected by a yaw rate sensor relative to the standard yaw rate estimated from the steering angle and the vehicle speed represents the tire grip condition around the grip limit.

However, the effectiveness of such a behavior control is based on a premise that the yaw rate sensor produces a correct signal according to the actual yaw rate. The yaw rate in the running operation of the vehicles is directly detectable by the so-called yaw rate sensors of various type, generally incorporating an angularly inertial element. By such a yaw rate sensors the yaw rate is directly detected at high responsiveness. Nevertheless, the commercially available yaw rate sensors are not yet highly stable in their performances, because it is very difficult as a matter of technique to measure instant values of a varying angular velocity.

On the other hand, it is possible to estimate the yaw rate of a vehicle, when it is a four-wheeled vehicle, from a comparison of the wheel rotation speed of a pair of left and right wheels, particularly a pair of driven, i.e. non-driving wheels. The wheel rotation speed can be detected easily at high accuracy. However, the estimation of the yaw rate according to this method is liable to an error due to a slippage of the wheels against the road surface.

It is also possible to estimate the yaw rate of a vehicle from the lateral acceleration of the vehicle body and the vehicle speed, detected by a lateral acceleration sensor and a vehicle speed sensor, respectively. The lateral acceleration sensors, also available in various types, are generally much more stable in their performance than the yaw rate sensors, because a linear acceleration, even varying, is detectable by a much simpler mechanism than a varying angular velocity. However, the estimation of the yaw rate of a vehicle from the lateral acceleration and the running speed thereof incorporates therein an error due to a lateral and a longitudinal slippage of the wheel against the road surface. Further, the estimation of the yaw rate from the lateral acceleration and the vehicle speed is bound with an inherent delay in its response.

SUMMARY OF THE INVENTION

In view of the above-mentioned problems concerned with the behavior control of vehicles according to the deviation of the yaw rate detected by a yaw rate sensor relative to a standard yaw rate estimated from the steering angle and the vehicle speed, and the merits and demerits of the various yaw rate detection means, it is a primary object of the present invention to provide an improved behavior control device of a vehicle by which the vehicle is more properly controlled of its behavior against a spin and/or a driftout based upon an improved estimation of the deviation of the actual yaw rate detected by a yaw rate sensor relative to the standard yaw rate estimated from the steering angle and the vehicle speed.

According to the present invention, the above-mentioned primary object is accomplished by a behavior control device of a vehicle having a vehicle body, front left, front right, rear left and rear right wheels suspended by the vehicle body, a steering system, and a brake system for selectively braking each of the wheels, the behavior control device comprising means for detecting yaw rate of the vehicle body, means for detecting rotation speed of the wheels, means for detecting steering angle of the steering system, means for detecting lateral acceleration of the vehicle body, and calculation-control means for calculating a first yaw rate deviation of the yaw rate detected by the yaw rate detection means relative to a standard yaw rate estimated from the steering angle detected by the steering angle detection means and vehicle speed detected by the wheel rotation speed detection means, and at least one of a second yaw rate deviation of a yaw rate estimated from wheel rotation speed of a pair of left and right ones of the wheels from the standard yaw rate and a third yaw rate deviation of a yaw rate estimated from the lateral acceleration detected by the lateral acceleration detection means and vehicle speed detected by the wheel rotation speed detection means from the standard yaw rate, the calculation-control means checking if the first yaw rate deviation is exceeding a threshold value determined therefor to generate a first positive control signal when an answer of the checking is yes, while checking if at least one of the second and third yaw rate deviations is exceeding a threshold value determined therefor to generate a second positive control signal when an answer of the checking is yes, and controlling the brake system to apply a controlled braking to at least one of the wheels, so as to suppress the first yaw rate deviation, when the second positive control signal was generated in addition to the first positive control signal.

In the behavior control device having such a construction as described above, the calculation-control means may check if at least one of the second and third yaw rate deviations is exceeding the threshold value determined therefor after having checked that the first yaw rate deviation exceeded the threshold value determined therefor over a threshold time duration determined therefor.

In such a case, the calculation-control means may check if at least one of the second and third yaw rate deviations is exceeding the threshold value determined therefor over a threshold time duration determined therefor to generate the second positive control signal thereon.

As an embodiment, the calculation-control means may check if the second and third yaw rate deviations are each exceeding the threshold value determined respectively therefor in succession in said order to generate the second positive control signal when at least one of the answer of the checking is yes.

Further, the calculation-control means may calibrate the yaw rate detection means with respect to a neutral shift thereof when the vehicle is at a stoppage or when the vehicle is running straight forward or both.

BRIEF DESCRIPTION OF THE DRAWINGS

In the accompanying drawings.

DESCRIPTION OF THE PREFERRED EMBODIMENT

In the following, the present invention will be described in more detail with respect to a preferred embodiment with reference to the accompanying drawings.

Figure 1:
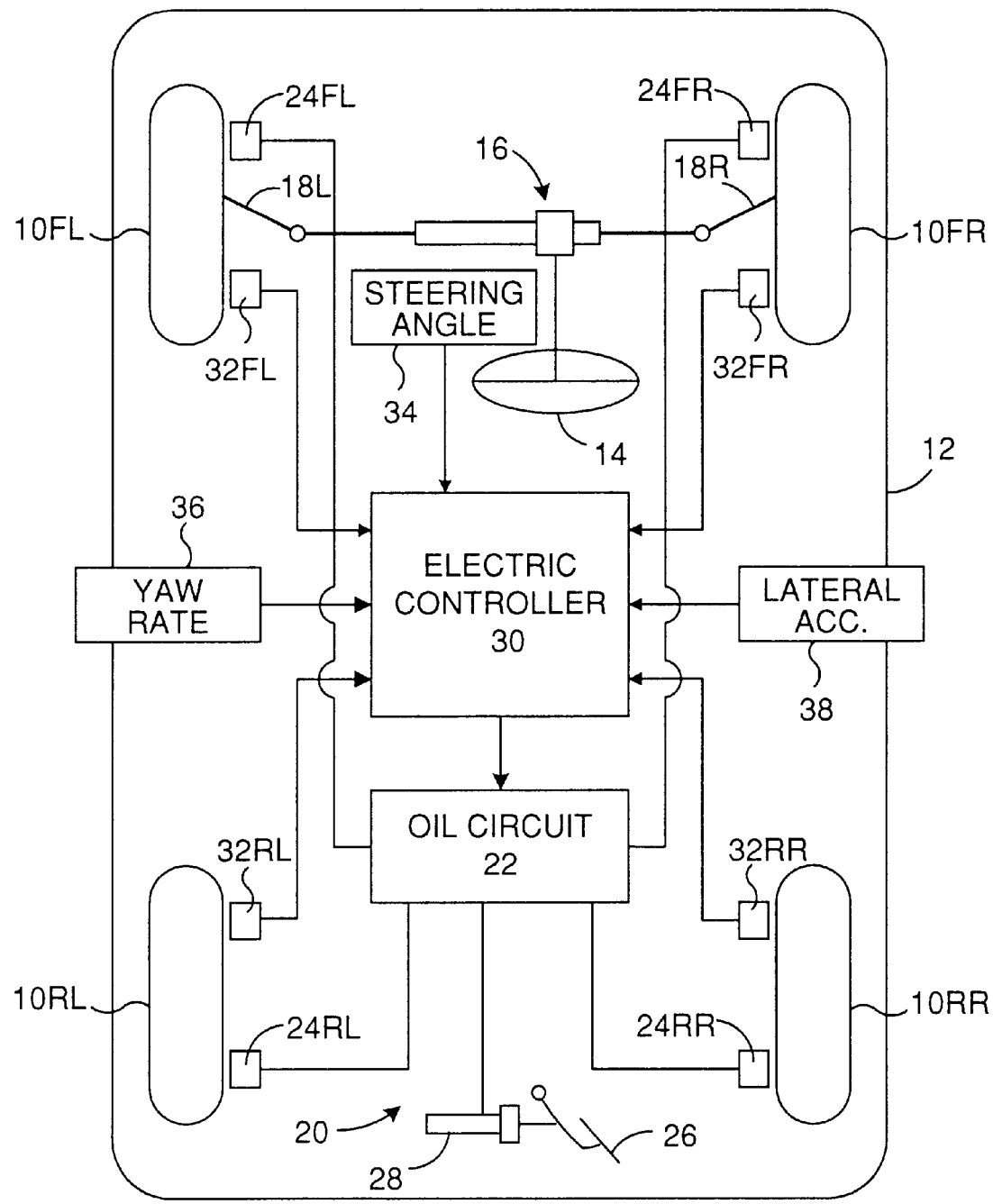
FIG. 1 is a diagrammatical plan view of a vehicle, showing parts and constructions thereof concerned with the present invention.

Referring to FIG. 1, a vehicle in which the present invention is incorporated in the form of an embodiment has a vehicle body 12, front left, front right, rear left and rear right wheels 10FL, 10FR, 10RL and 10RR suspended by the vehicle body 12, an engine not shown in the figure, and a brake system for selectively braking the wheels, the brake system including wheel cylinders 24FL, 24FR, 24RL and 24RR adapted to apply friction forces to the corresponding brake disks (not shown) of the front left, front right, rear left and rear right wheels, respectively, an oil circuit 22 for selectively supplying raised oil pressure to each of the wheel cylinders, and a combination of a brake pedal 26 and a master cylinder 28 connected with the oil circuit 22 for selectively raising the oil pressure supplied to the wheel cylinders according to a depression of the brake pedal by a driver. An electric controller 30 forming a brain of the behavior control device is constructed substantially by an electronic computer adapted to control the oil circuit 22 according to certain calculations based upon various parameters including at least wheel speed of each wheel detected by wheel speed sensors 32FL, 32FR, 32RL and 32RR for the front left, front right, rear left and rear right wheels, respectively, steering angle detected by a steering angle sensor 34, yaw rate detected by a yaw rate sensor 36, and lateral acceleration detected by a lateral acceleration sensor 38.

The construction of the behavior control device shown in FIG. 1 will be described hereinbelow from an aspect of the operation thereof by referring to the flowcharts shown in FIGS. 2–4.

Figure 2:
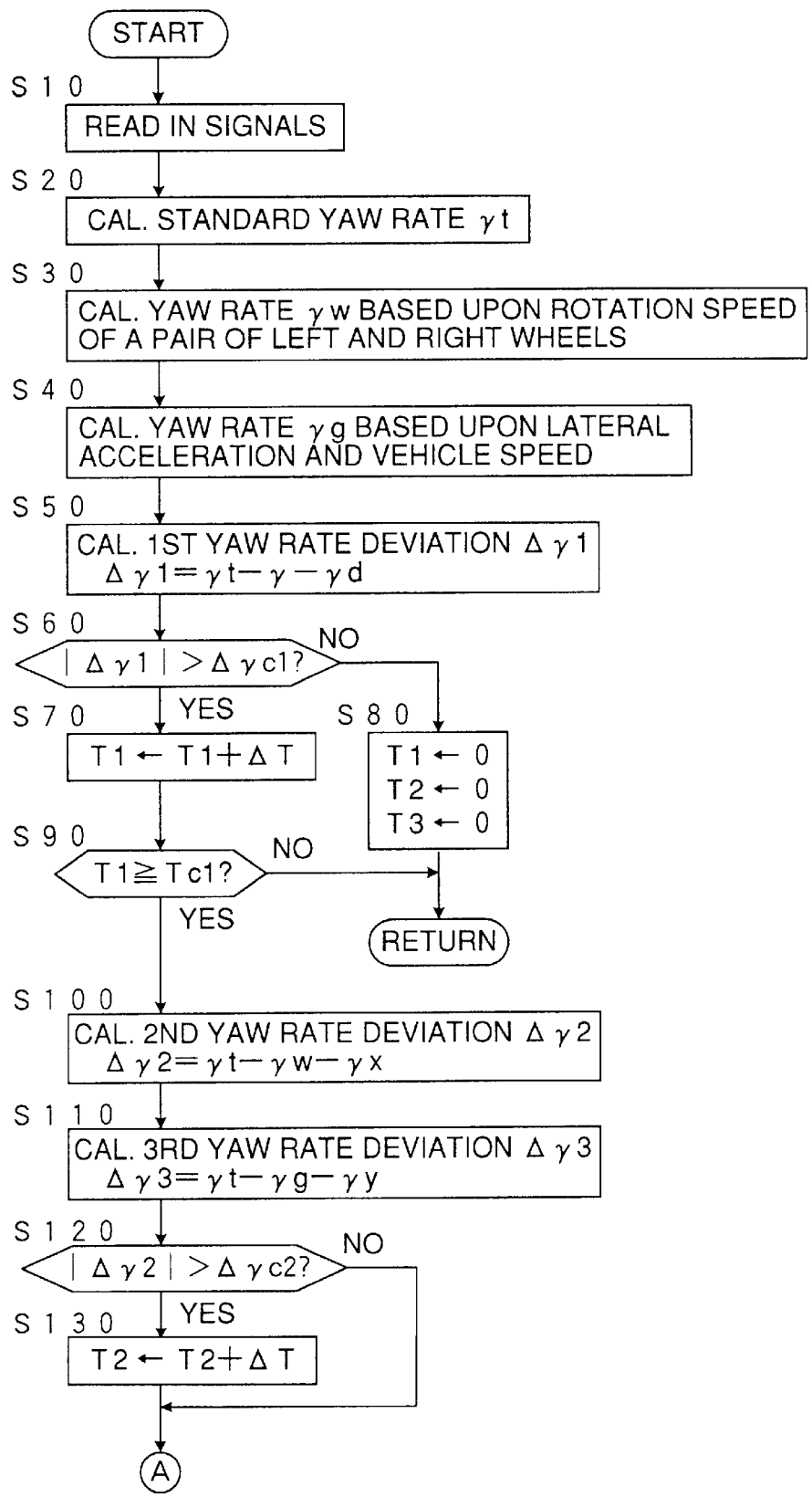
FIGS. 2 and 3 are flowcharts showing, in combination, an embodiment of the present invention from an aspect of the operation thereof.
Figure 3:
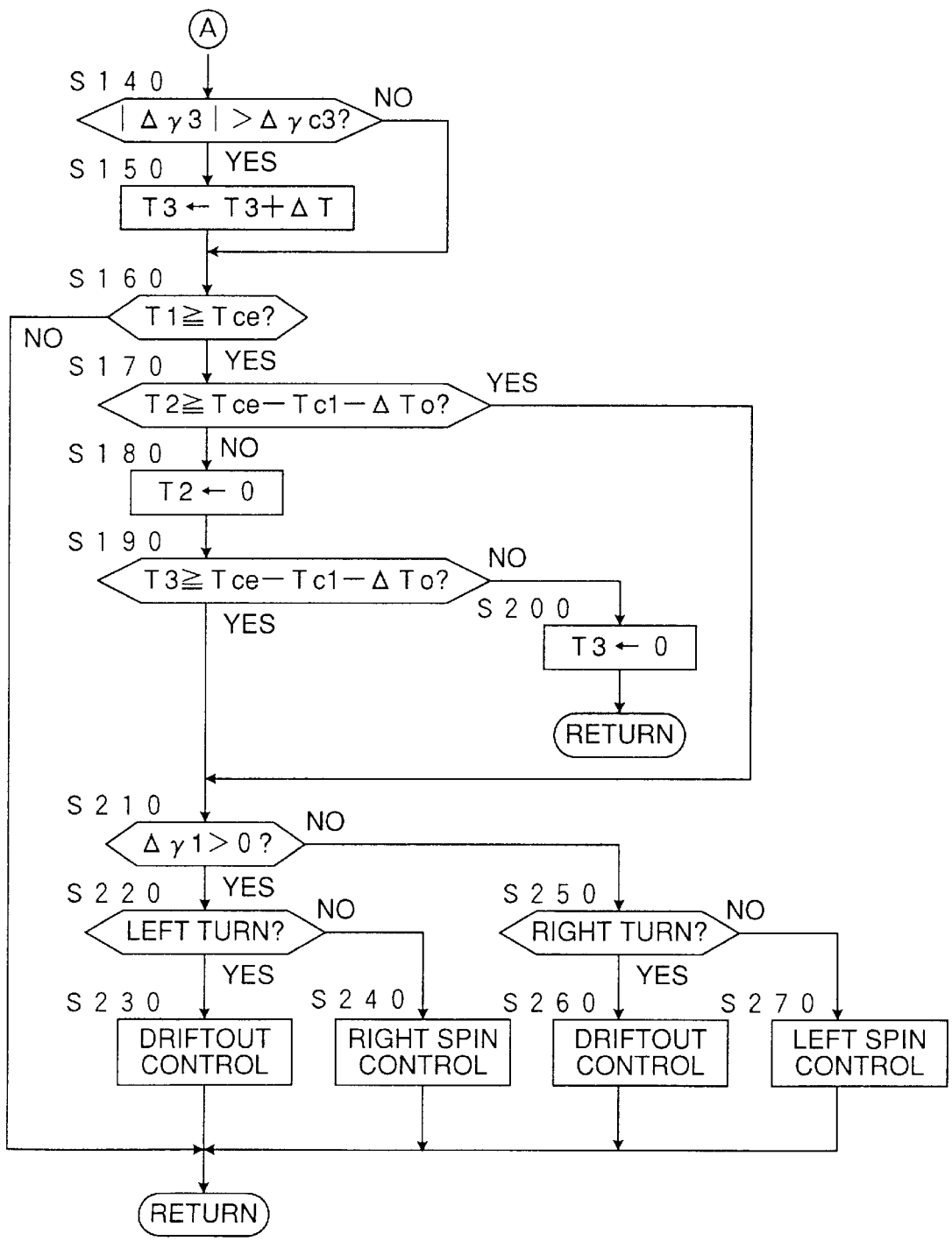

Referring to FIGS. 2 and 3 as connected in series at a terminal A provided only for the convenience of illustration, when the control is started by a closure of an ignition switch not shown in the figure, in step 10 signals are read in from those sensors shown in FIG. 1, including wheel speed Vfl, Vfr, Vrl and Vrr detected by the wheel speed sensors 32FL, 32RF, 32RL and 32RR, respectively, angle $\theta$ from the steering angle sensor 34, yaw rate $\gamma$ from the yaw rate sensor 36, and lateral acceleration Gy from the lateral acceleration sensor 38.

In step 20, a standard yaw rate $\gamma t$ which is a yaw rate estimated to be due based upon the vehicle speed and the steering angle when the tire grip is firm is calculated according to the following equations 1 and 2:

$$\gamma c = \theta \cdot V/(R \cdot H) - Kh \cdot Gy \cdot V \quad (1)$$

$$\gamma t = \gamma c/(1+T \cdot s) \quad (2)$$

In the above equations, V is vehicle speed which may be obtained from an average of wheel speeds Vfl–Vrr or one of them considered to be slipping the least at each moment, R is a steering gear ratio, H is a wheel base, Kh is a proportioning factor, T is a time constant, and s is the Laplace operator.

In step 30, a yaw rate $\gamma w$ based upon a comparison of the wheel rotation speed of a pair of left and right wheels is estimated, assuming that the vehicle is an ordinary rear drive vehicle, according to the following equation 3:

$$\gamma w = (a \cdot Vfr - b \cdot Vfl)/Tr \quad (3)$$

In the above equation, "a" and "b" are proportioning factors for estimating the yaw rate based upon a comparison of the rotation speed of the front right and front left wheels spaced apart from one another as much as the wheel track Tr. In this connection, in the above and the following calculations, the parameters distinctive of the direction of turn of the vehicle are made positive when the vehicle is turning to the left, while the parameters are made negative when the vehicle is turning to the right.

In step 40, yaw rate $\gamma g$ based upon the lateral acceleration and the vehicle speed is estimated according to the following equation 4:

$$\gamma g = Gy/V \quad (4)$$

In step 50, a 1st yaw rate deviation $\Delta\gamma1$ is calculated as a different of a yaw rate $\gamma$ detected by the yaw rate sensor 36 relative to the standard yaw rate $\gamma t$, with a compensation of a neutral shift $\gamma d$ representing a casual shift of the neutral point of the indication of the yaw rate sensor 36, as follows:

$$\Delta\gamma1 = \gamma t - \gamma - \gamma d \quad (5)$$

Figure 4:
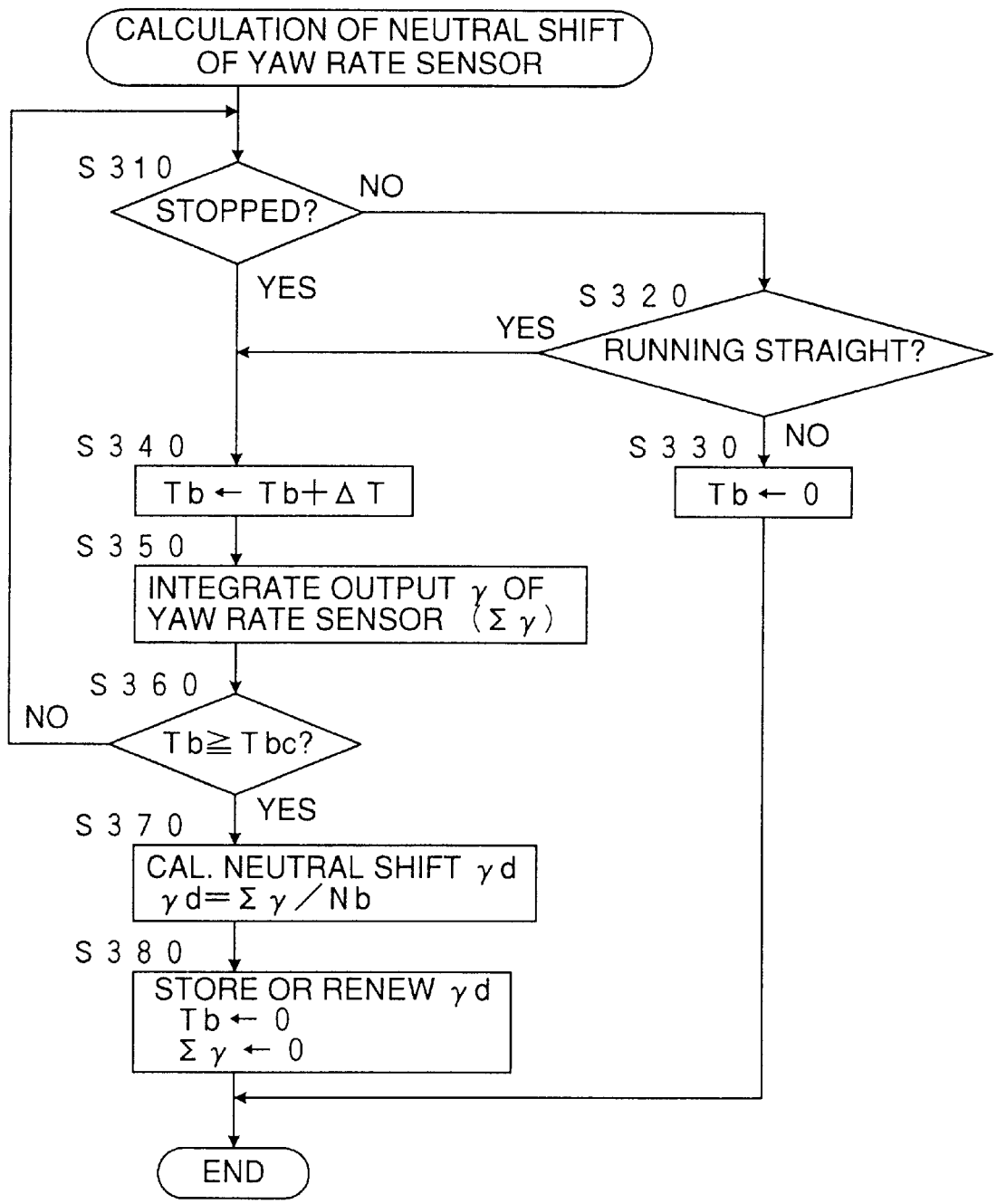
FIG. 4 is a sub-routine incorporated in the flowchart of FIGS. 2 and 3.

The estimation of the neutral shift compensation $\gamma d$ may be made by a sub-routine such as shown in FIG. 4 appropriately incorporated in the control pass between steps 10 and 40.

In step 60, it is checked if the absolute value of the 1st yaw rate deviation $\Delta\gamma1$ is larger than a first threshold value Δγc1 determined therefor as a standard for executing the yaw rate suppress control described in detail hereinbelow. When the answer is yes, the control proceeds to step 70, whereas when the answer is no, the control proceeds to step 80.

In step 70, a time parameter T1 for counting the duration in which the condition that |Δγ1| is larger than Δγc1 is lasting is incremented by a unit time ΔT. When the control proceeded to step 80, T1 and other time counting parameters T2 and T3 described hereinbelow are all reset to zero. As is usual, these parameters and others are generally reset to zero at the very beginning of the control according to the flowcharts of FIGS. 2–4.

In step 90, it is checked if T1 has reached a threshold value Tc1 determined provisionally to be a duration of the 1st yaw rate deviation Δγ1 lasting so long at a relatively high level as to need a yaw rate suppress control. When the answer is no, the control returns to step 10 to be repeated, whereas when the answer is yes, the control proceeds to step 100.

In step 100, a 2nd yaw rate deviation Δγ2 is calculated to represent the deviation of the yaw rate γw based upon the comparison of rotation speed of the pair of left and right wheels relative to the standard yaw rate γt, as follows:

$$\Delta\gamma 2 = \gamma t - \gamma w - \gamma x \tag{6}$$

In the above equation 6, γx is a term of a compensation for a neutral shift of γw due to an unbalance of the air pressure and/or the wear of the left and right wheel tires, which may be determined when the vehicle is running straight forward with the steering system held at the neutral position.

In step 110, a 3rd yaw rate deviation Δγ3 is calculated to represent the deviation of the yaw rate γg estimated based upon the lateral acceleration and the vehicle speed relative to the standard yaw rate γt, as follows:

$$\Delta\gamma 3 = \gamma t - \gamma g - \gamma y \tag{7}$$

In the above equation 7, γy is a term of a compensation for a neutral shift of γg of the lateral acceleration sensor. This term may also be calibrated when the vehicle is running straight forward with the steering system held at the neutral position. Since the lateral acceleration sensors generally incorporating a mass element biased to its neutral position by elastic means are generally stable with respect to the neutral position, in the estimation of the 3rd yaw rate deviation Δγ3 according to the above equation, γy may be generally very small such as to be almost negligible.

In step 120, it is checked if the absolute value of the 2nd yaw rate deviation Δγ2 is larger than a threshold value Δγc2 determined therefor to confirm a substantial deviation of the yaw rate even based upon the comparison of the rotation speed of a pair of left and right wheels being so large as to need a yaw rate suppress control. When the answer is yes, the control proceeds to step 130, and the time parameter T2 is incremented by a unit time ΔT. When the answer of step 120 is no, step 130 is bypassed.

In step 140, it is checked if the absolute value of the 3rd yaw rate deviation Δγ3 is larger than a threshold value Δγc3 determined therefor to confirm that even the yaw rate deviation estimated based upon the lateral acceleration and the vehicle speed relative to the standard yaw rate is so large as to need a yaw rate suppress control. When the answer is yes, the control proceeds to step 150, and the time parameter T3 is incremented by a unit time ΔT which may be the same as ΔT in step 130, so as to count the lasting time of such a condition. When the answer of step 140 is no, step 150 is bypassed.

In step 160, it is checked if the time parameter T1 is equal to or larger than a threshold value Tce determined to count a time duration in which the confirmation estimations of the yaw rate deviation based upon the comparison of the rotation speed of the pair of left and right wheels and the yaw rate deviation based upon the lateral acceleration and the vehicle speed are carried out to a desirable extent. When the answer is no, the control returns, to carry on the control processes as repeated from step 10. When the answer of step 160 is yes, the control proceeds to step 170.

In step 170, it is checked if the time parameter T2 is equal to or larger than Tce−Tc1−ΔTo, wherein ΔTo is a small time allowance for such a case that the control is switched from no to yes in step 90 according to a judgement that T1 is not equal to Tc1 but larger than Tc1, so that the value of T2 will be slightly smaller than Tce−Tc1 even when the control passed through step 130 and/or step 150 every time of the scanning circulation. When the answer of step 170 is yes, it is confirmed that the yaw rate deviation has increased so much as to need the yaw rate suppress control from the viewpoint of the yaw rate deviation watched by the output of the yaw rate sensor as well as the viewpoint of the yaw rate deviation watched by the comparison of the rotation speed of the pair of left and right wheels.

When the answer of step 170 is yes, the need of the yaw rate suppress control according to the output of the yaw rate sensor is confirmed by the comparison of the rotation speed of the pair of left and right wheels, and therefore, the control proceeds to step 210. On the other hand, when the answer of step 170 is no, the control proceeds to step 180, and the time parameter T2 is reset to zero, deeming that the yaw rate deviation according to the output of the yaw rate sensor is not so certain as to actually execute the yaw rate suppress control.

In the shown embodiment, even when the answer of step 180 was no, in step 190 it is further checked if the time parameter T3 is equal to or larger than Tce−Tc1−ΔTo. When the answer of step 190 is yes, it means that although the need of the yaw rate suppress control was not confirmed by the yaw rate deviation watching based upon the comparison of the rotation speed of the pair of left and right wheels, the yaw rate deviation watching based upon the lateral acceleration and the vehicle speed confirms the need of the yaw rate suppress control. Therefore, the control proceeds to step 210, whereas when the answer of step 190 is no, the control proceeds to step 200, the time parameter T3 is reset to zero, and the control returns to step 10.

When the control reached step 210, the yaw rate suppress control is executed as described hereinbelow.

In step 210, it is checked if Δγ1 is positive. As defined above, in the processes through steps 10–200, the parameters distinctive of the direction of turn of the vehicle are made positive when the vehicle is turning to the left, while the parameters are made negative when the vehicle is turning to the right. When the answer of step 210 is yes, the control proceeds to steps 220, whereas when the answer of step 210 is no, the control proceeds to step 250.

In step 220, it is checked if the vehicle is turning to the left. When the answer is yes, the situation is judged such that the vehicle is turning to the left with the actual yaw rate γ being behind the theoretical target yaw rate γt estimated from the vehicle speed and the steering angle, i.e. the vehicle is drifting out. Therefore, the control proceeds to step 230, and a driftout control is executed. In contrast, when the answer of step 220 is not, the situation is such that the vehicle is turning to the right with the actual yaw rate γ advancing the theoretical standard yaw rate γt, i.e. the vehicle is spinning. Therefore, the control proceeds to step 240, and a right spin control is executed.

In step 250, it is checked if the vehicle is turning to the right. When the answer is yes, the situation is such that the vehicle is turning to the right with the actual yaw rate γ being behind to the theoretical target yaw rate γt, i.e. the vehicle is drifting out. Therefore, the control proceeds to step 260, and a driftout control is executed. In contrast, when the answer of step 250 is no, the situation is such that the vehicle is turning to the left with the actual yaw rate γ advancing the theoretical standard yaw rate γt, i.e. the vehicle is spinning to the left. Therefore, the control proceeds to step 270, and a left spin control is executed.

Figure 6:
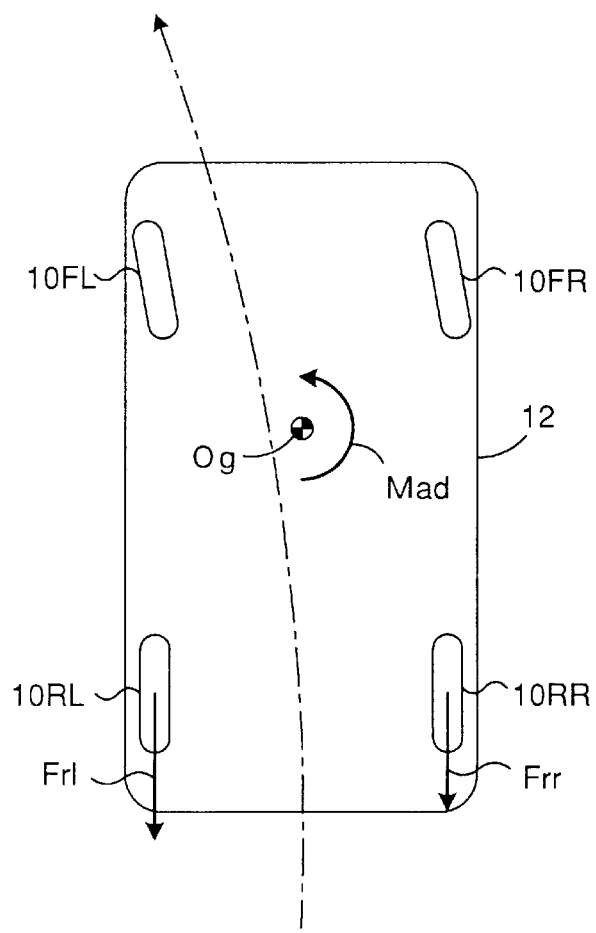
FIG. 6 is a diagrammatical plan view of a vehicle during a spin suppress control.

In the driftout control in step 230 or step 260, as an embodiment, both of the rear left and rear right wheels 10RL and 10RR are braked to be applied with each controlled braking force such as Frl and Frr as shown in FIG. 6, so as to decelerate the vehicle, with a resultant effect that the driftout is suppressed. Further, in the embodiment shown in FIG. 6, the braking force Frl applied to the rear left wheel 10RL is made larger than the braking force Frr applied to the rear right wheel 10RR. Such an unbalance of the braking forces generates a yaw moment in the vehicle which is evaluated as Mad around the center of gravity Og of the vehicle. Therefore, the braking as a driftout control shown in FIG. 6 is more effective for the driftout control during a left turn of the vehicle. As is apparent, when the vehicle is turning to the right, a brake control with a larger braking force applied to the rear right wheel than to the rear left wheel is more effective as a driftout control.

Figure 5:
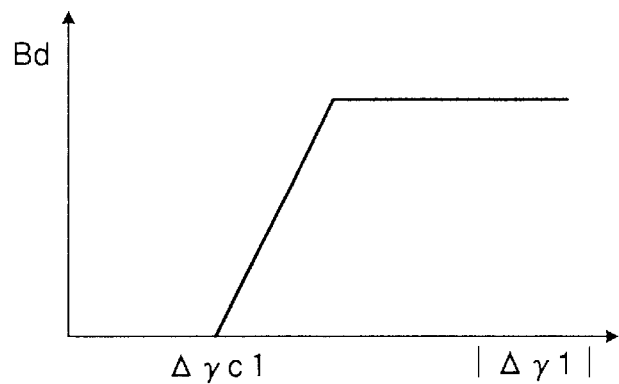
FIG. 5 is a map showing an example of the performance of the driftout suppress braking force Bd described hereinbelow relative to the absolute value of the yaw rate deviation $\Delta\gamma1$.

FIG. 5 is a map showing an example of the relationship between the magnitude of the yaw rate deviation |Δγ1| and the magnitude of the braking force Bd generally applied to the rear wheels for suppressing a driftout.

Figure 8:
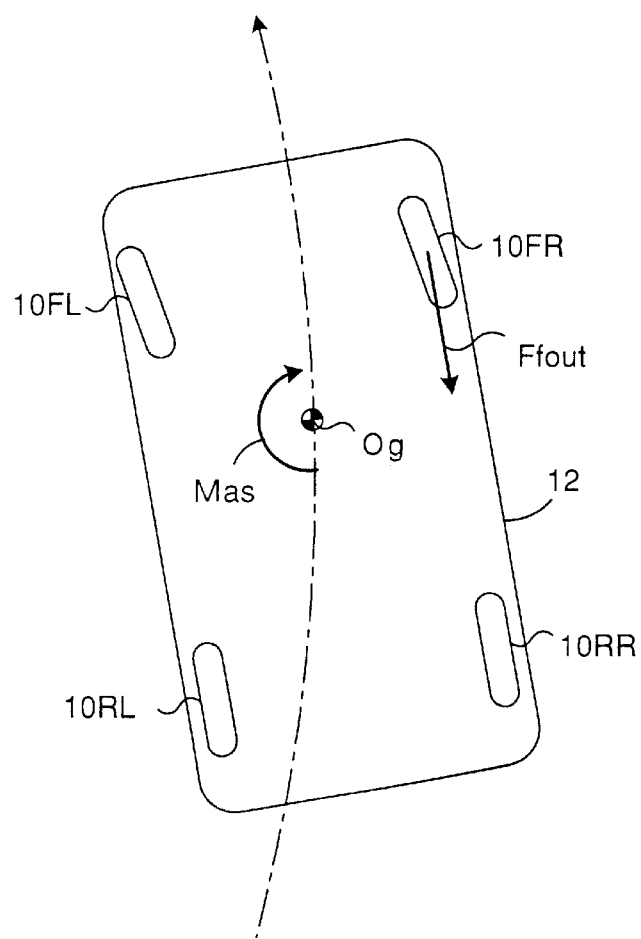
FIG. 8 is a diagrammatical plan view of a vehicle during a spin control.

In the left spin control of step 270, a braking is applied to the front right wheel 10FR as shown in FIG. 8. By a braking force being applied to the front right wheel 10FR, a clockwise turning moment is generated in the vehicle around the braked front right wheel 10FR by the inertia force of the vehicle concentrated at the center of gravity Og of the vehicle, thereby generating an equivalent clockwise yaw moment Mas around the center of gravity Og, acting against the spinning movement of the vehicle. As is also apparent, in the right spin control of step 130, a braking is applied to the front left wheel FL.

Figure 7:
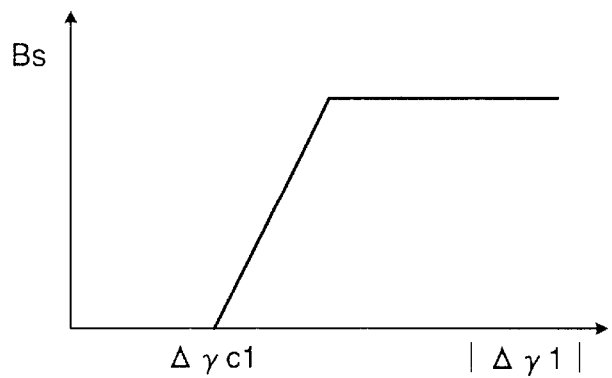
FIG. 7 is a map showing an example of the performance of the spin suppress braking force Bs described hereinbelow relative to the absolute value of the yaw rate deviation $\Delta\gamma1$.

FIG. 7 is a map showing an example of the relationship between the magnitude of the yaw rate deviation |Δγ1| and the magnitude of the braking force Bs applied to the front wheel at the outside of the turn in the left or right spin control.

Figure 9:
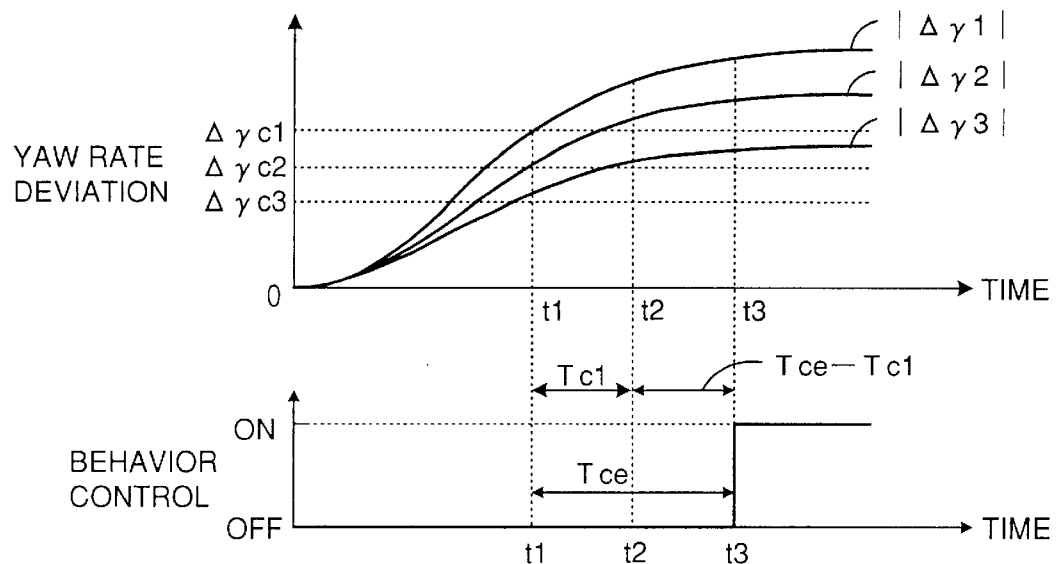
FIG. 9 is a diagram showing an example of the relationship among the time based performances of the three kinds of yaw rate deviations described hereinbelow and the execution of the behavior control.
Figure 10:
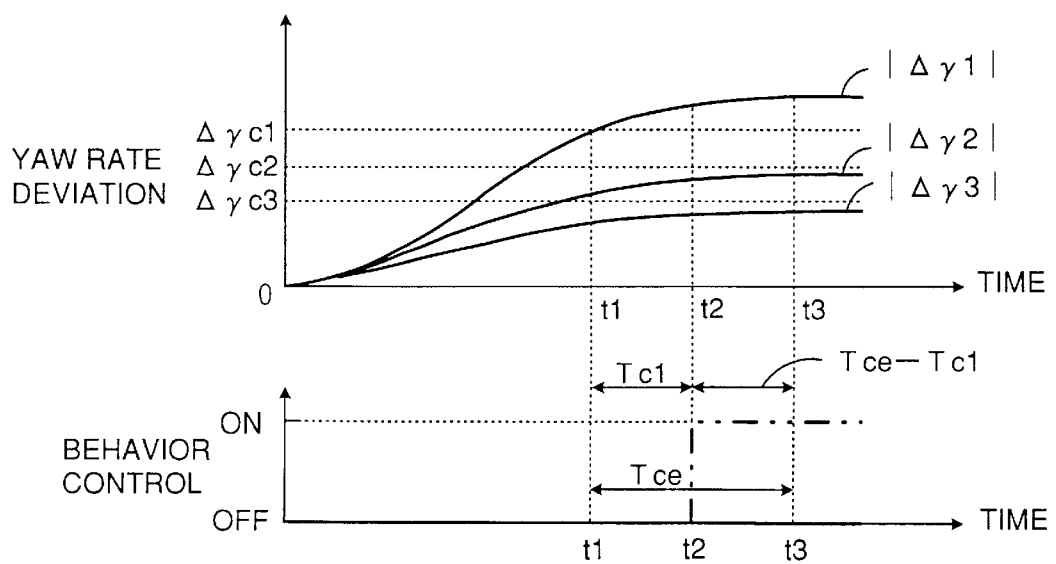
FIG. 10 is a diagram similar to FIG. 9, showing another example of the time-based performances of the three kinds of yaw rate deviations and the execution of the behavior control.

The double or triple check confirmation of the actual tire grip condition by the three kinds of yaw rate deviation Δγc1, Δγc2 and Δγc3 according to the above-mentioned steps 60–200 is illustrated in FIGS. 9 and 10 with respect to a first and second example, respectively, the first example shown in FIG. 9 being such a case that the deviation of yaw rate according to the output of the yaw rate sensor 36 beyond the threshold value Δγc1 is confirmed by the deviation Δγ2 of the yaw rate detected based upon the comparison of the rotation speed of the pair of left and right wheels exceeding the threshold value Δγc2 determined therefor and further by the deviation Δγ3 of the yaw rate detected based upon the lateral acceleration and the vehicle speed exceeding the threshold value Δγc3 determined therefor, so that the execution of the behavior control is started after the lapse of time Tce including the period Tc1 for confirming the threshold exceed of the yaw rate deviation Δγ1 and the period (Tce−Tc1) for confirming the threshold exceed of the yaw rate deviations Δγ2 and Δγ3, while in the second example shown in FIG. 10, although the exceed of the yaw rate deviation Δγ1 was detected over the time duration Tce, no threshold exceed of the yaw rate deviations Δγ2 and Δγ3 was detected in the period (Tce−Tc1) succeeding to the period Tc1. Therefore, by the provision of such a double or triple checking with regard to whether the yaw rate deviation is really exceeding the threshold value determined therefor, it is avoided that the yaw rate suppress behavior control is probably undesirably executed as shown by a two dot-phantom line in FIG. 10.

Although in the example of FIG. 10 neither of the yaw rate deviations Δγ2 and Δγ3 is exceeding the respective threshold values Δγc2 and Δγc3 in the period (Tce−Tc1), it will of course occur that both of the yaw rate deviations Δγ2 and Δγ3 or at least Δγ3 does not exceed the respective threshold value Δγc2 or Δγc3 during a part of the period (Tce−Tc1). In such a case, when the time allowance ΔTo is so determined as described above such as only to give an allowance for a minute discordance in the comparison in step 90 of time T1 progressing stepwise by the unit time ΔT with the threshold value Tc1 not necessarily by a multiple of ΔT, any substantially partial lack of the condition |Δγ2|>|Δγc2| or |Δγ3|>|Δγc3| during the period (Tce−Tc1) will negate the confirmation of the need of the yaw rate suppress control based upon the watching of the yaw rate deviation Δγ1 according to the output of the yaw rate sensor. However, if the value of ΔTo is appropriately modified to be larger, such a partial lack of the condition |Δγ2|>|Δγc2| or |Δγ3|>|Δγc3| during the period (Tce−Tc1) will be entered into a predetermined allowance for the positive confirmation by the double or triple checking.

Further, although in the embodiment shown in FIGS. 2 and 3 the confirmation of the yaw rate deviation over the threshold value therefor based upon the comparison of the rotation speed of a pair of left and right wheels and another confirmation based upon the lateral acceleration and the vehicle speed are executed in a tandem relationship of said order, one of these two kinds of confirmation may be omitted or the order of execution of these two confirmation processes may be reversed.

The neutral shift γd of the yaw rate sensor 36 used in step 50 is calculated according to the process shown in the flowchart of FIG. 4. According to this flowchart, in step 310, it is checked if the vehicle is stopped. When the answer is yes, the control proceeds to step 340, whereas when the answer is no, the control proceeds to step 320, and it is checked if the vehicle is running straight forward. When the answer is yes, the control proceeds to step 340, whereas when the answer is no, the control proceeds to step 330, wherein a time parameter Tb described hereinbelow is reset to zero, and the control of this sub-routine is ended.

In step 340, the time parameter Tb is incremented by a small amount ΔT.

In step 350, the output γ of the yaw rate sensor 36 is integrated such that the instant output value of γ is added up to the value of γ obtained up to the preceding cycle.

In step 360, it is checked if the time parameter Tb had reached a predetermined value Tbc. When the answer is yes, the control proceeds to step 370, whereas if the answer is no, the control returns to step 310. Therefore, if the condition that the vehicle is at least stopped or running straight forward is lost after the control has started to circulate through steps 310–360 before the value Tbc is counted up, the process through this sub-routine is immediately ended.

In step 370, the value of the neutral shift γd is calculated as a mean value of each instant value of γ by the integrated value of γ being divided by a number Nb corresponding to the times of repetition of the process through steps 310–360.

In step 380, the newly obtained value of γd is stored or the value of γd obtained by the preceding process is replaced by the newly obtained value of γd, and thereafter the time parameter Tb and the integrated value of γ are both reset to zero.

Although the present invention has been described in detail with respect to a particular embodiment thereof, it will be apparent for those skilled in the art that the present invention is not restricted to the shown embodiment.

What is claimed is:

1. A behavior control device of a vehicle having a vehicle body, front left, front right, rear left and rear right wheels suspended by the vehicle body, a steering system, and a brake system for selectively braking each of the wheels, the behavior control device comprising:

means for detecting a yaw rate of the vehicle body;

means for detecting a rotation speed of the wheels;

means for detecting a steering angle of the steering system;

means for detecting lateral acceleration of the vehicle body; and calculation-control means for calculating:

a first yaw rate deviation of the yaw rate detected by the yaw rate detection means relative to a standard yaw rate estimated from the steering angle detected by the steering angle detection means and vehicle speed detected by the wheel rotation speed detection means, and at least one of a second yaw rate deviation of a yaw rate estimated from wheel rotation speed of a pair of left and right ones of the wheels from the standard yaw rate and a third yaw rate deviation of a yaw rate estimated from the lateral acceleration detected by the lateral acceleration detection means and vehicle speed detected by the wheel rotation speed detection means from the standard yaw rate, the calculation-control means checking:

if the first yaw rate deviation is exceeding a first threshold value determined therefor to generate a first control signal for execution of a spin or driftout control according to a direction of the first yaw rate deviation when an answer of the checking is yes, and also if at least one of the second and third yaw rate deviations is exceeding a second threshold value determined therefor to generate a second control signal for execution of a spin or driftout control corresponding to the spin or driftout control due to the first yaw rate deviation according to a direction of the associated second or third yaw rate deviation when an answer of the checking is yes, and the calculation-control means controlling the vehicle against a spin or driftout associated with first yaw rate deviation according to the first yaw rate deviation, when the second control signal was generated in addition to the first control signal.

2. A behavior control device according to claim 1, wherein the calculation-control means checks if at least one of the second and third yaw rate deviations is exceeding the associated second or third threshold value after having checked that the first yaw rate deviation exceeded the first threshold value over a first threshold time duration.

3. A behavior control device according to claim 2, wherein the calculation-control means checks if at least one of the second and third yaw rate deviations is exceeding the associated second or third threshold value over an associated second or third threshold time duration determined therefor to generate the second control signal thereon.

4. A behavior control device according to claim 1, wherein the calculation-control means checks if the second and third yaw rate deviations are each exceeding the associated second or third threshold value respectively in succession in order to generate the second control signal when at least one of the answer of the checking is yes.

5. A behavior control device according to claim 1, wherein the calculation-control means calibrates the yaw rate detection means with respect to a neutral shift thereof when the vehicle is at a stoppage or when the vehicle is running straight forward or both.

* * * * *